United States Patent
Liu et al.

(10) Patent No.: US 10,977,476 B2
(45) Date of Patent: Apr. 13, 2021

(54) DERMATOGLYPHICS DATA ACQUISITION DEVICE, ACQUISITION METHOD THEREOF AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yingming Liu, Beijing (CN); Xue Dong, Beijing (CN); Haisheng Wang, Beijing (CN); Xiaochuan Chen, Beijing (CN); Shengji Yang, Beijing (CN); Ming Yang, Beijing (CN); Wei Liu, Beijing (CN); Hongjuan Liu, Beijing (CN); Qian Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/731,702

(22) Filed: Dec. 31, 2019

(65) Prior Publication Data
US 2020/0134290 A1  Apr. 30, 2020

Related U.S. Application Data

(63) Continuation-in-part of application No. 15/168,667, filed on May 31, 2016, now abandoned.

(30) Foreign Application Priority Data

Jun. 1, 2015 (CN) .......................... 201510293901.9
Dec. 26, 2019 (CN) ......................... 201911365475.X

(51) Int. Cl.
G06K 9/00 (2006.01)
G06F 3/044 (2006.01)
G06F 3/042 (2006.01)

(52) U.S. Cl.
CPC ......... G06K 9/00087 (2013.01); G06F 3/042 (2013.01); G06F 3/0443 (2019.05);
(Continued)

(58) Field of Classification Search
CPC ............ G06K 9/0002; G06K 9/00067; G06K 9/00087; G06K 9/0004; G06F 3/0412;
(Continued)

(56) References Cited

U.S. PATENT DOCUMENTS 3,946,151 A    3/1976  Kamiyama et al.
8,605,960 B2  12/2013  Orsley
(Continued)

FOREIGN PATENT DOCUMENTS

CN    101996005 A    3/2011
CN    104063094 A    9/2014
(Continued)

OTHER PUBLICATIONS

The First Chinese Office Action dated Jun. 5, 2017; Appln. No. 201510293901.9.
(Continued)

*Primary Examiner* — Antonio Xavier

(57) ABSTRACT

A dermatoglyphics data acquisition device, an acquisition method thereof and a display device are disclosed. The acquisition method of dermatoglyphics data includes: detecting a touch region of a dermatoglyphics on a touch device by a capacitive touch control circuit; selecting a touch center region in the touch region and selecting a characteristic region in the touch center region by a controller, according to a signal amount distribution of a touch
(Continued)

signal generated by dermatoglyphics contact in the touch region, and determining the characteristic region as a dermatoglyphics scan region by the controller; and scanning a dermatoglyphics in the dermatoglyphics scan region and generating the dermatoglyphics data by a dermatoglyphics identification circuit.

18 Claims, 12 Drawing Sheets

(52) U.S. Cl.
CPC ......... *G06K 9/0002* (2013.01); *G06K 9/0004* (2013.01); *G06K 9/00067* (2013.01); *G06F 2203/04106* (2013.01)

(58) Field of Classification Search
CPC ........ G06F 3/042; G06F 3/044; G06F 3/0443; G06F 2203/04106
See application file for complete search history.

(56) References Cited

U.S. PATENT DOCUMENTS

| | | | |
|---|---|---|---|
| 2002/0015024 A1* | 2/2002 | Westerman | G06F 3/04815 345/173 |
| 2003/0174870 A1 | 9/2003 | Kim et al. | |
| 2005/0151065 A1* | 7/2005 | Min | G09G 3/3406 250/214 R |
| 2007/0290971 A1 | 12/2007 | Shih et al. | |
| 2008/0030633 A1 | 2/2008 | Tsai et al. | |
| 2008/0192988 A1 | 8/2008 | Uludag et al. | |
| 2009/0033850 A1 | 2/2009 | Ishiguro et al. | |
| 2010/0039406 A1 | 2/2010 | Lee et al. | |
| 2010/0188332 A1 | 7/2010 | Orsley | |
| 2011/0261191 A1 | 10/2011 | Byren et al. | |
| 2011/0310036 A1 | 12/2011 | Juan et al. | |
| 2012/0092302 A1 | 4/2012 | Imai et al. | |
| 2014/0104194 A1* | 4/2014 | Davidson | G06F 3/0488 345/173 |
| 2014/0218327 A1 | 8/2014 | Shi et al. | |
| 2015/0029157 A1 | 1/2015 | Wang | |
| 2015/0029421 A1 | 1/2015 | Gu et al. | |
| 2015/0062019 A1 | 3/2015 | Fredriksen | |
| 2015/0186092 A1 | 7/2015 | Francis et al. | |
| 2015/0205440 A1 | 7/2015 | Yang et al. | |
| 2015/0355739 A1* | 12/2015 | Hong | G06F 3/0418 345/174 |
| 2015/0355743 A1 | 12/2015 | Hu et al. | |
| 2015/0371073 A1 | 12/2015 | Cho et al. | |
| 2016/0042216 A1 | 2/2016 | Yang et al. | |
| 2016/0092717 A1 | 3/2016 | Ling | |
| 2016/0132712 A1 | 5/2016 | Yang et al. | |
| 2016/0148036 A1 | 5/2016 | Kim et al. | |
| 2016/0188023 A1 | 6/2016 | Chang et al. | |
| 2016/0349882 A1* | 12/2016 | Liu | G06F 3/0412 |
| 2017/0115811 A1 | 4/2017 | Yang et al. | |
| 2018/0165534 A1 | 6/2018 | Gao | |
| 2018/0247099 A1 | 8/2018 | Liu et al. | |

FOREIGN PATENT DOCUMENTS

| | | |
|---|---|---|
| CN | 104155785 A | 11/2014 |
| CN | 104252279 A | 12/2014 |

OTHER PUBLICATIONS

USPTO FOA dated Apr. 11, 2019 in connection with U.S. Appl. No. 15/168,667.
USPTO NFOA dated Aug. 28, 2019 in connection with U.S. Appl. No. 15/168,667.
USPTO NFOA dated Oct. 9, 2018 in connection with U.S. Appl. No. 15/168,667.

* cited by examiner

DERMATOGLYPHICS DATA ACQUISITION DEVICE, ACQUISITION METHOD THEREOF AND DISPLAY DEVICE

This application is a Continuation-in-Part application of U.S. application Ser. No. 15/168,667 filed on May 31, 2016, and the above-quoted U.S. application claims the priority of Chinese patent application No. 201510293901.9 filed on Jun. 1, 2015. This application also claims priority under 35 U.S.C. 119 from CN 201911365475.X filed on Dec. 26, 2019.

TECHNICAL FIELD

Embodiments of the present disclosure relate to a dermatoglyphics data acquisition device, an acquisition method thereof and a display device.

BACKGROUND

Human skin comprises an epidermis layer and a dermis layer. Epidermis nipples protrude toward to the surface of skin and form a plurality of nipple lines which are arranged orderly. The nipple lines are called ridges, and recessed portions between the ridges are called furrows. The epidermis layer of the skin of palm or finger forms various dermatoglyphics due to different arrangements of the ridges and the furrows. The term "dermatoglyphics" refers to texture pattern of particular portions of human skin.

Human dermatoglyphics is of individual characteristics. Dermatoglyphics is formed at the 14th week in embryonic development period, and will not be changed and is of high stability. In some case, such as chromosomal abnormalities, congenital diseases and so on, dermatoglyphics will be changed and can be taken as circumstantial evidence for diagnosis or a basis for preliminary selection.

Due to individual characteristics of dermatoglyphics and its change as diagnosis basis, recognition of dermatoglyphics can be adopted in identification system or in medical diagnosis system.

With rapid development of display technologies, touch screen panels have been used widely in daily life of people. Currently, touch screen panels can be classified into following categories according to their operation principles: resistive type, capacitive type, infrared type, surface acoustic wave type, electromagnetic type, vibration wave sensing type, frustrated total internal reflection optical sensitive type, or the like. Capacitive-type touch screen panel among these touch screen panels has become most popular and attractive in the industry due to its particular touch control principle, high sensitivity, long lifetime, high transmittance etc.

SUMMARY

Embodiments of the disclosure provide a dermatoglyphics data acquisition device, an acquisition method thereof and a display device, in order to reduce time and power consumption for identifying a dermatoglyphics.

At least one embodiment of the disclosure provides a dermatoglyphics data acquisition device, comprising: a capacitive touch control circuit, configured to detect a touch region of a dermatoglyphics on a touch device; a controller, configured to select a touch center region in the touch region and select a characteristic region in the touch center region, according to a signal amount distribution of a touch signal generated by dermatoglyphics contact in the touch region, and configured to determine the characteristic region as a dermatoglyphics scan region; and a dermatoglyphics identification circuit, configured to scan a dermatoglyphics in the dermatoglyphics scan region and generate a dermatoglyphics data.

At least one embodiment of the disclosure provides a display device, comprising the above-mentioned dermatoglyphics data acquisition device.

At least one embodiment of the disclosure provides an acquisition method of a dermatoglyphics data, comprising: detecting a touch region of a dermatoglyphics on a touch device by a capacitive touch control circuit; selecting a touch center region in the touch region and selecting a characteristic region in the touch center region by a controller according to a signal amount distribution of a touch signal generated by dermatoglyphics contact in the touch region, and determining the characteristic region as a dermatoglyphics scan region by the controller; and scanning a dermatoglyphics in the dermatoglyphics scan region and generating the dermatoglyphics data by a dermatoglyphics identification circuit.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
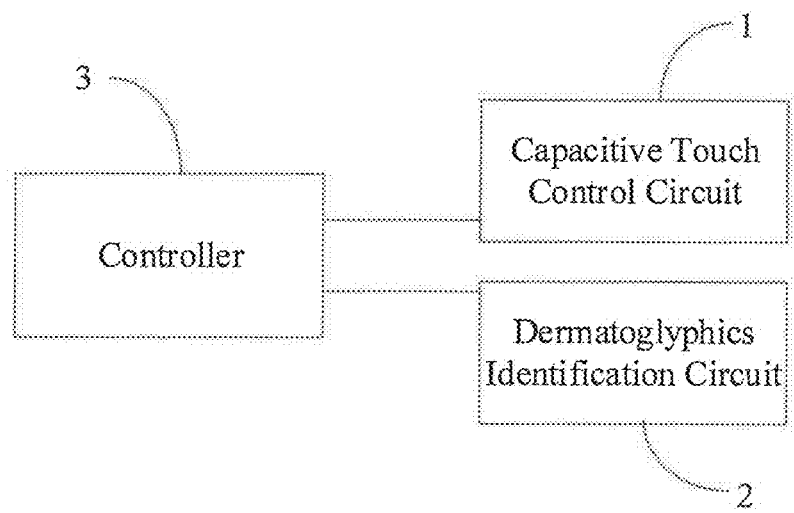
FIG. 1 is a schematic structural diagram of an in-cell touch screen panel according to an embodiment of the disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In a personality identification system based on touch screen panel for security, a method of identifying dermatoglyphics (such as fingerprint or palmprint) using a dermatoglyphics identification apparatus is used. Currently, a dermatoglyphics identification module (such as a fingerprint identification module) is usually provided on a blank region outside a display region of the touch screen panel to achieve the function of dermatoglyphics identification. The system usually needs to be operated after identifying the dermatoglyphics in detection, which is not convenient, and it is necessary to integrate a display device and a dermatoglyphics identification device during manufacturing the system, and the manufacture process becomes more complicated.

Therefore, a dermatoglyphics identification region is provided on the display region, that is, the dermatoglyphics identification and the touch function is integrated. However, in a touch screen panel, signals over all of the dermatoglyphics touch control read lines of the display region are required to be scanned and processed to identify the dermatoglyphics, and in this way a large amount of data need to be processed, and especially for a display screen with a large size, a huge large amount of data need to be processed. Consequently, it takes a longer time period and takes more power consumption to identify the dermatoglyphics.

At least one of the embodiments of the disclosure provides a dermatoglyphics data acquisition device, the dermatoglyphics data acquisition device including: a capacitive touch control circuit configured to detect a touch region of a dermatoglyphics on a touch device; a controller, configured to, according to a signal amount distribution of a touch signal generated by dermatoglyphics contact in the touch region, select a touch center region in the touch region and select a characteristic region in the touch center region, and configured to determine the characteristic region as a dermatoglyphics scan region; and a dermatoglyphics identification circuit, configured to scan a dermatoglyphics in the dermatoglyphics scan region and generate a dermatoglyphics data.

In the above-mentioned dermatoglyphics data acquisition device, the determined dermatoglyphics scan region is located within the touch region, and an area of the dermatoglyphics scan region is smaller than an area of the touch region, which can reduce the time for scanning or identifying the dermatoglyphics, and reduce power consumption of the device.

The dermatoglyphics data acquisition device of the present disclosure may have various types, such as an on-cell touch screen panel and an in-cell touch screen panel. In at least one example, the above-mentioned acquisition device is an in-cell touch screen panel.

At least one of the embodiments of the disclosure provides an in-cell touch screen panel. As illustrated in FIG. 1, the in-cell touch screen panel includes a capacitive touch control circuit 1, and the capacitive touch control circuit 1 is configured to detect a touch position of a dermatoglyphics on a touch device. Further, in at least one example, the capacitive touch control circuit 1 is further configured to detect a touch region of a dermatoglyphics on an in-cell touch screen panel. For example, the capacitive touch control circuit includes a plurality of capacitive touch control electrodes arranged in a matrix and a touch control detection chip. The touch control detection chip is electrically connected with each of the capacitive touch control electrodes, and is configured to determine the touch position by detecting variation of capacitance of the capacitive touch control electrodes.

The in-cell touch screen panel further includes a dermatoglyphics identification circuit 2 and a controller 3.

Figure 2:
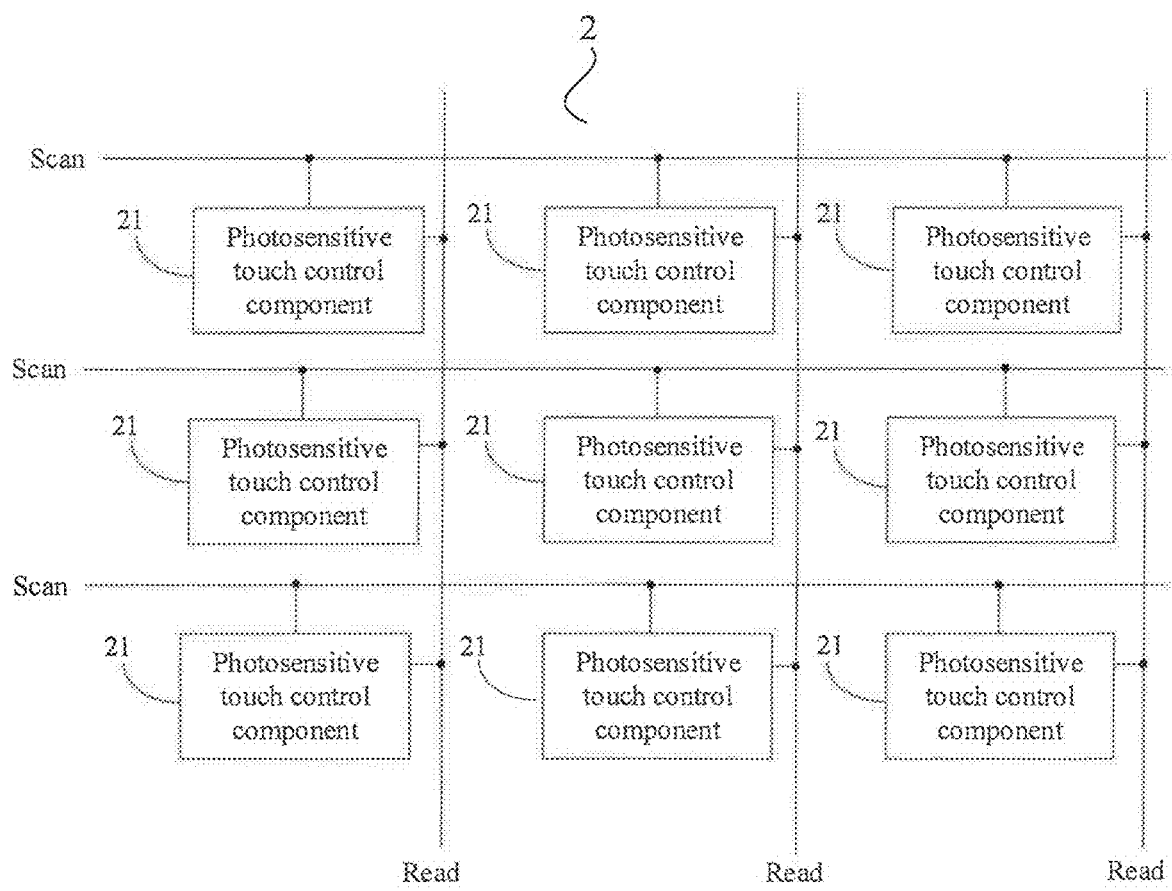
FIG. 2 is a schematic structural diagram of a dermatoglyphics identification circuit of the in-cell touch screen panel according to an embodiment of the disclosure.
Figure 16:
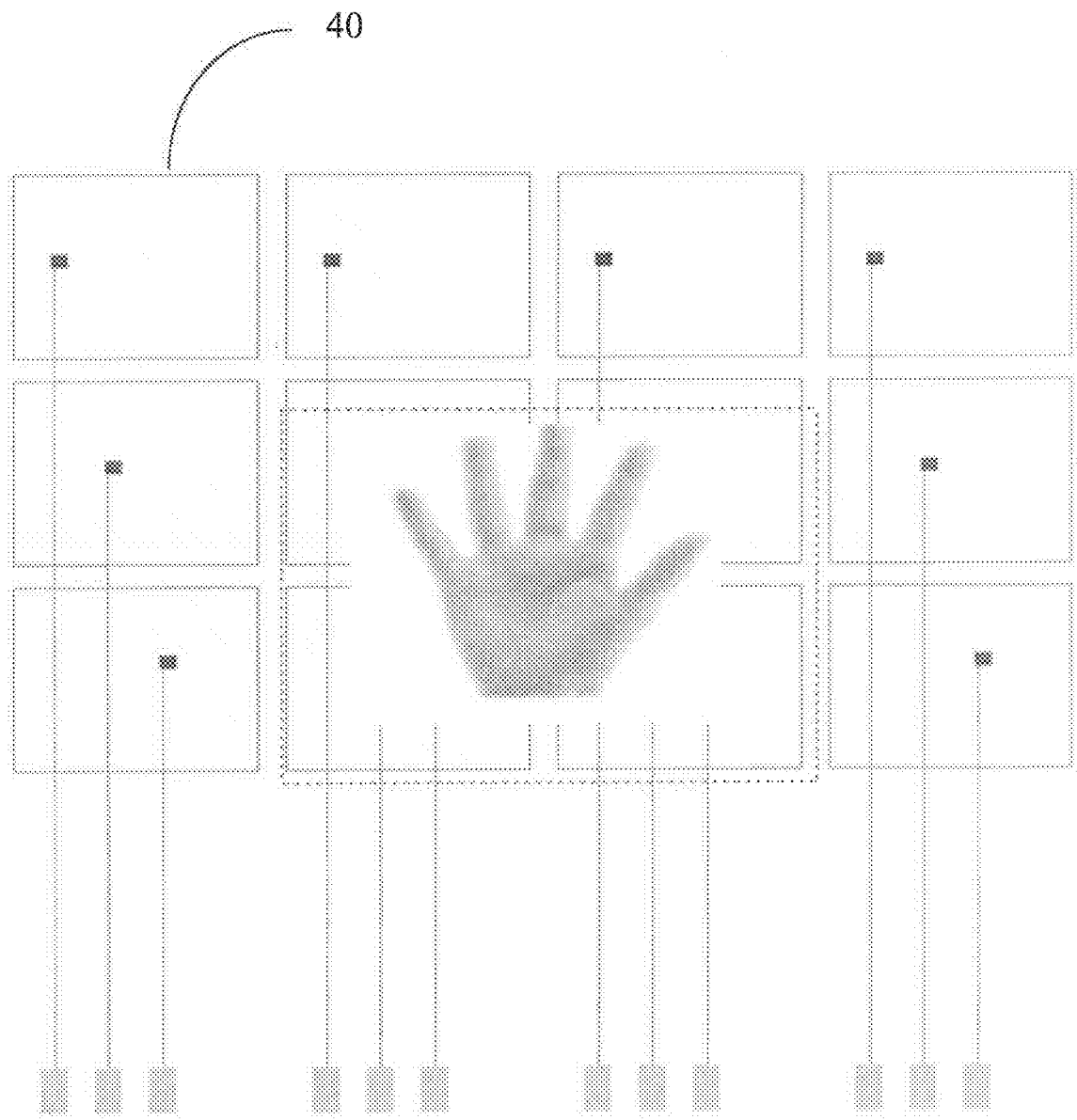
FIG. 16 is a schematic diagram of a plurality of self-capacitance touch control electrodes in an in-cell touch screen panel according to an embodiment of the disclosure.
Figure 17:
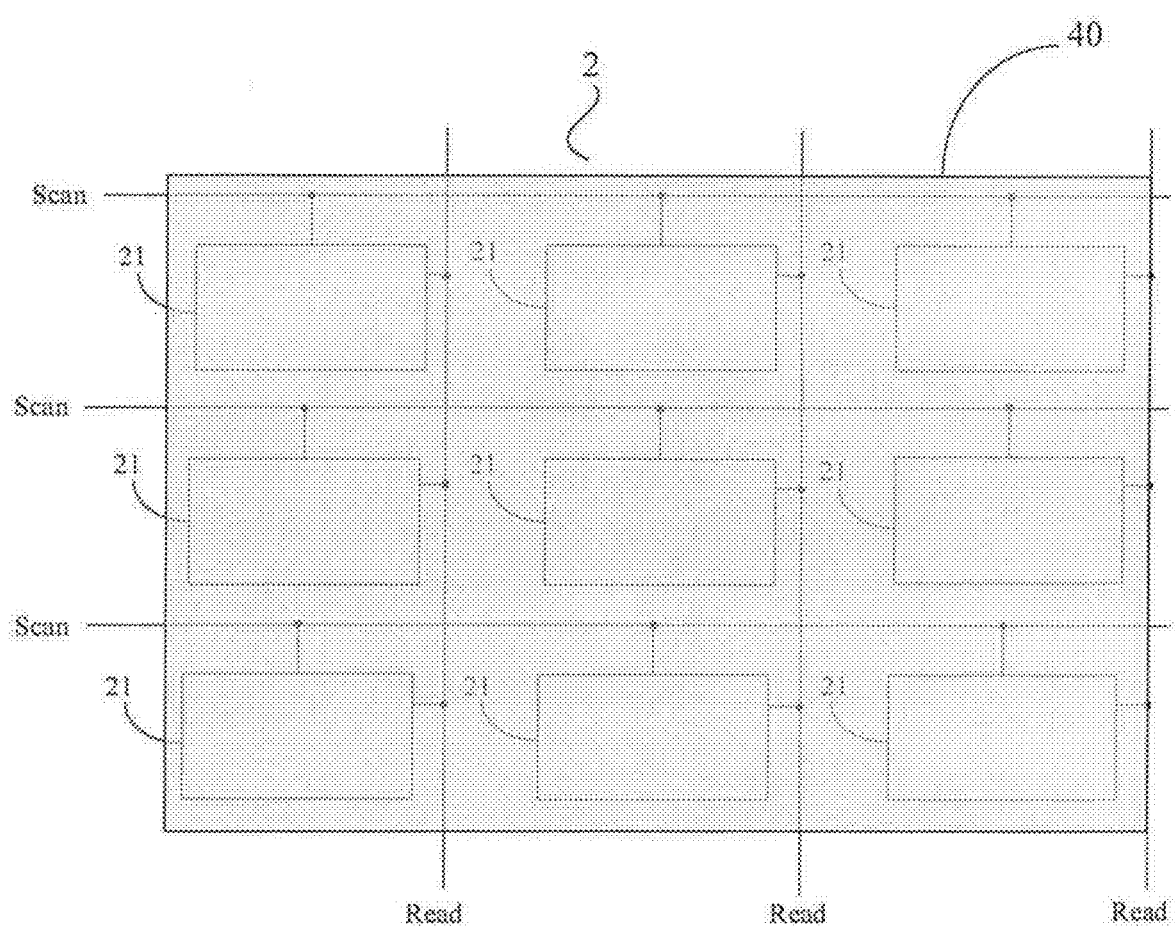
FIG. 17 is a schematic diagram of a plurality of self-capacitance touch control electrodes and a plurality of photosensitive touch control components in an in-cell touch screen panel according to an embodiment of the disclosure.

The dermatoglyphics identification circuit 2 includes a plurality of photosensitive touch control components 21 arranged in a matrix, and each of the capacitive touch control electrodes corresponds to some of the photosensitive touch control components. As illustrated in FIG. 16, for example, the in-cell touch screen panel includes a plurality of capacitive touch control electrodes 40 arranged in a matrix. As illustrated in FIG. 17, a plurality of photosensitive touch control components 21 are provided in a region where each capacitive touch control electrode 40 is located. In this way, in a case where the touch position is determined by the capacitive touch control electrodes 40, fast and low-resolution detection can be achieved, and in a case where the dermatoglyphics is acquired or recognized by the photosensitive touch control components 21, a high-resolution detailed scanning can be achieved. For example, the dermatoglyphics identification circuit 2 further includes a plurality of dermatoglyphics touch control scan lines Scan that are connected with respective rows of photosensitive touch control components correspondingly, and a plurality of dermatoglyphics touch control read lines Read that are connected with respective columns of photosensitive touch control components correspondingly. For example, as illustrated in FIG. 2, the dermatoglyphics identification circuit 2 is configured to identify a dermatoglyphics in a corresponding detection region and generate an identification signal through the photosensitive touch control components 21, and when the controller 3 outputs the dermatoglyphics scan signal to the dermatoglyphics touch control scan lines Scan connected with the photosensitive touch control components 21, the photosensitive touch control components 21 output the identification signal to the dermatoglyphics touch control read lines Read.

The controller 3 is connected with the capacitive touch control circuit 1, the dermatoglyphics touch control scan lines Scan, and the dermatoglyphics touch control read lines Read respectively. The controller 3 is configured to determine a dermatoglyphics scan region according to a touch control position, after the capacitive touch control circuit 1 determines the touch control position, and for example to output a dermatoglyphics scan signal to each of the dermatoglyphics touch control scan lines Scan corresponding to the dermatoglyphics scan region and processes the identification signal output from each of the dermatoglyphics touch control read lines Read corresponding to the dermatoglyphics scan region. Further, in at least one example, the controller 3 is configured to select a touch center region in the touch region and select a characteristic region in the touch center region, according to a signal amount distribution of a touch signal generated by dermatoglyphics contact in the touch region, and to determine the characteristic region as the dermatoglyphics scan region. In this case, the dermatoglyphics identification circuit 2 is configured to scan a dermatoglyphics in the dermatoglyphics scan region and generate a dermatoglyphics data. The controller 3 may be embodied with hardware (e.g., DSP, PLC, or CPU), firmware, software, or any combination thereof; for example the controller may be implemented with a memory, a processor, and one or more modules stored in the memory, and the one or more modules comprises program instructions to realize the intended function or steps.

The above-mentioned in-cell touch screen panel according to the embodiment of the disclosure includes a capacitive touch control circuit, a dermatoglyphics identification circuit, and a controller. The capacitive touch control circuit determines a touch control position. The controller is configured to determine a dermatoglyphics scan region according to the touch control position, after the capacitive touch control circuit determines the touch control position. The dermatoglyphics identification circuit identifies a dermatoglyphics in the dermatoglyphics scan region and generates an identification signal through the photosensitive touch control components thereof, and when the dermatoglyphics touch control scan lines connected with the photosensitive touch control components receive dermatoglyphics scan signal output from the controller, the photosensitive touch control component outputs the identification signal to the dermatoglyphics touch control read lines of the dermatoglyphics identification circuit. The controller reads the identification signals output from the dermatoglyphics touch control read lines and processes the signals. Thus the controller performs the dermatoglyphics touch control scan and the signal process with respect to only the dermatoglyphics scan region corresponding to the touch control position determined by the dermatoglyphics identification circuit, thus the time for dermatoglyphics touch control scanning and the amount of data to be processed can be remarkably reduced, and in turn the time and power consumption for identifying the dermatoglyphics is reduced also.

It should be noted that, in the above-mentioned in-cell touch screen panel according to the embodiment of the disclosure, the capacitive touch control circuit can be of, but not limited to, mutual capacitive type or self-capacitive type. In a case where the capacitive touch control circuit is of mutual capacitive type, capacitive touch control electrodes include touch control driving electrodes and touch control sensing electrodes. In a case where the capacitive touch control circuit is of self-capacitive type, the capacitive touch control electrodes only include self-capacitive electrodes. The structure and configuration of the touch control circuit of mutual capacitive type or the touch control circuit of self-capacitive type can be embodied the same as the structure and configuration of a conventional touch control circuit of mutual capacitive type or a conventional touch control circuit of self-capacitive type, and the structure and configuration will not be elaborated herein.

In the above-mentioned in-cell touch screen panel, the determined dermatoglyphics scan region is located within the touch region, and the area of the dermatoglyphics scan region is smaller than the area of the touch region, which can reduce the time for scanning or identifying the dermatoglyphics, and reduce device power consumption.

The above-mentioned in-cell touch screen panel according to the embodiment of the disclosure is applicable to a liquid crystal display (LCD) panel and is also applicable to an organic light emitting diode (OLED) display, e-ink display, or the like. This is not limited herein.

Further, the above-mentioned in-cell touch screen panel according to the embodiment of the disclosure further includes sub-pixels arranged in a matrix, gate signal lines located between adjacent rows of the sub-pixels, and data signal lines located between adjacent columns of the sub-pixels.

The pixel resolution of a touch screen panel is usually in millimeters order. Thus, in an embodiment of the disclosure, the capacitive touch control electrodes of the capacitive touch control circuit can be arranged on the basis of a desired touch control resolution. The resolution of the sub-pixels for displaying of the touch screen panel is usually in micrometers order. Therefore, a touch control point of the capacitive touch control circuit generally corresponds to a plurality of sub-pixels of the touch screen panel.

Further, the dermatoglyphics identification circuit is used to acquire the dermatoglyphics, and in at least one example, the dermatoglyphics identification circuit is used to identify the dermatoglyphics, and high accuracy is required. Thus, the touch control resolution of the dermatoglyphics identification circuit is less compared to the touch control resolution of the capacitive touch control circuit, and is generally larger than the resolution of the sub-pixels for displaying of the touch screen panel. Therefore, a photosensitive touch control component of the dermatoglyphics identification circuit can correspond to a plurality of sub-pixels. According to an embodiment of the disclosure, respective photosensitive touch control components can be built in respective sub-pixels, and the periodic distribution manner, the distribution density or pitch of all the photosensitive touch control components can be designed according to actual conditions.

The embodiments of the disclosure will be explained in detail below. It should be noted that, the embodiments are described for better illustrating the disclosure, and it should not be construed as limiting the disclosure.

Figure 3:
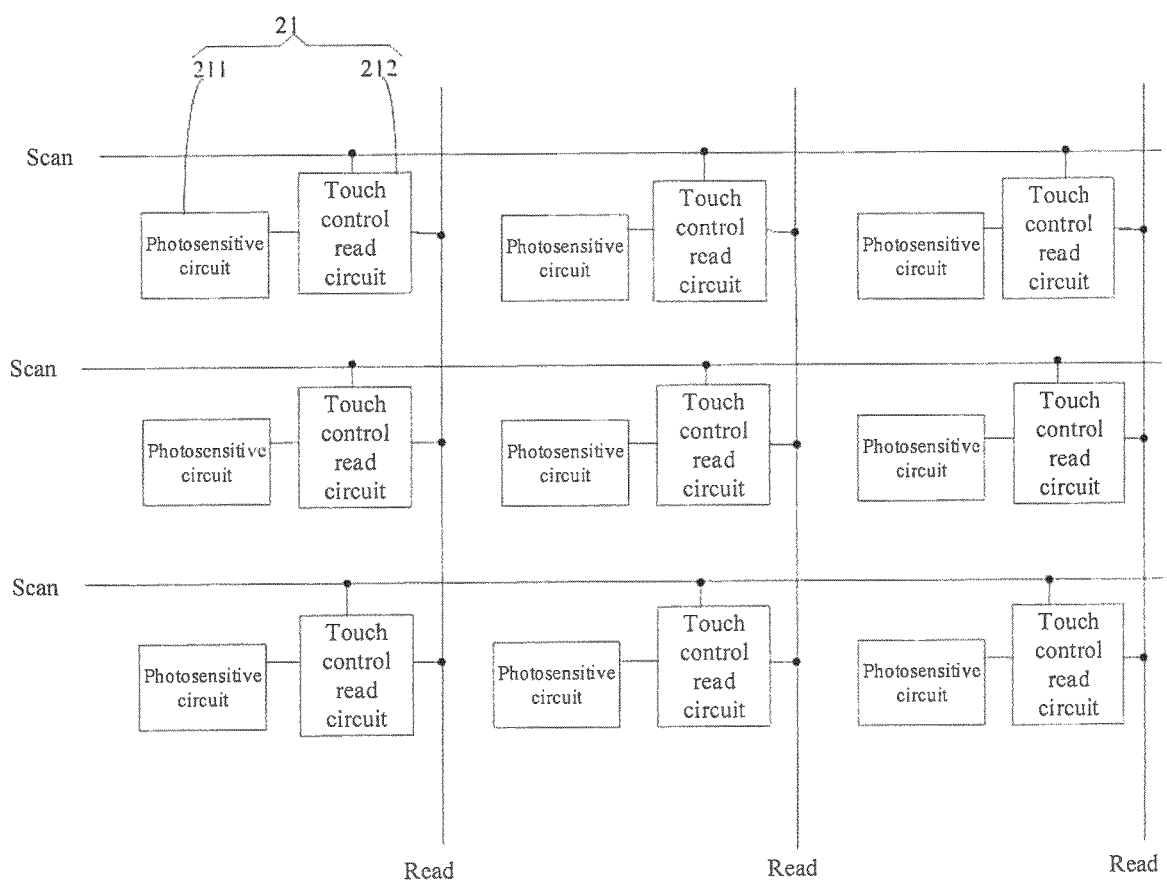
FIG. 3 is a schematic structural diagram of a dermatoglyphics identification circuit of the in-cell touch screen panel according to another embodiment of the disclosure.

Optionally, according to the above-mentioned in-cell touch screen panel of the embodiment of the disclosure, as illustrated in FIG. 3, the photosensitive touch control component 21 includes a photosensitive circuit 211 and a touch control read circuit 212.

An output terminal of the photosensitive circuit 211 is connected with an input terminal of the touch control read circuit 212, a control terminal of the touch control read circuit 212 is connected with a corresponding dermatoglyphics touch control scan line Scan, and an output terminal of the touch control read circuit 212 is connected with a corresponding dermatoglyphics touch control read line Read.

The photosensitive circuit 211 is configured to generate an identification signal when receiving light and provide the identification signal to the input terminal of the touch control read circuit 212. For example, the photosensitive circuit 211 is configured to receive the light which is emitted from a light source built in the touch screen panel and is reflected to the photosensitive circuit 211 by the skin of the human body touching the panel when the skin touches the touch screen panel.

The touch control read circuit 212 is configured to be in on-state when the dermatoglyphics scan signal is received over the corresponding dermatoglyphics touch control scan line, and output the received identification signal to the dermatoglyphics touch control read line Read.

Figure 4:
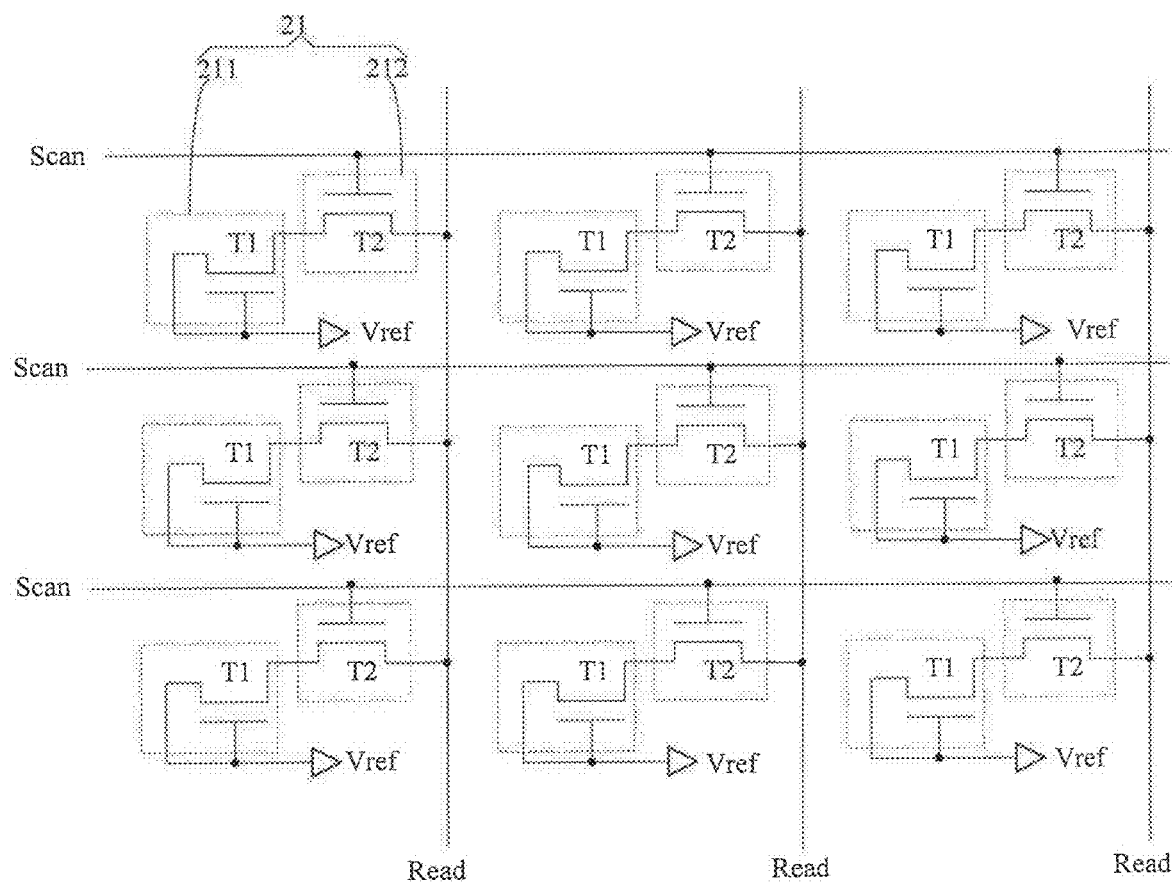
FIG. 4 is a schematic structural diagram of a dermatoglyphics identification circuit of the in-cell touch screen panel according to yet another embodiment of the disclosure.

In the in-cell touch screen panel according to an embodiment of the disclosure, as illustrated in FIG. 4, an example of the photosensitive circuit 211 includes a photosensitive transistor T1. A source electrode and a gate electrode of the photosensitive transistor T1 are connected with a reference signal terminal Vref, and a drain electrode of the photosensitive transistor T1 is used as the output terminal of the photosensitive circuit 211.

The working principle of the photosensitive transistor is as follows. If the touch by a human body does not occur, light from the light source built in the touch screen panel emits out directly, and the photosensitive transistor does not receive reflected light. Thus the photosensitive transistor does not output the identification signal. If the skin of the human body touches the touch screen panel, the light from the light source built in the touch screen panel is reflected to the photosensitive transistor by the skin, and the conductive carrier concentration of the active layer of the photosensitive transistor increases because the light intensity sensed by the photosensitive transistor increases, to generate the identification signal. The photosensitive transistor outputs the identification signal to the touch control read circuit. In addition, the identification signal output from the photosensitive transistor is related to intensity of light received by the photosensitive transistor. The stronger the received light, the greater the identification signal output from the photosensitive transistor to the touch control read circuit is. Because the skin has an uneven dermatoglyphics, resulting in different light intensities in regions corresponding to concave and convex points of the dermatoglyphics, whether the dermatoglyphics on a corresponding position is a concave point or a convex point can be determined by determining the magnitude of the identification signal.

According to an embodiment of the disclosure, a part of components of the photosensitive transistor as the photosensitive circuit can be prepared in the same layers as a part of components of switch transistors of sub-pixels of the touch screen panel. In such a way, the process for the photosensitive circuit and the display panel can be achieved by only modifying a corresponding patterning for each layer, without requiring too many new processes, which saves production costs and improves production efficiency. Of course, the photosensitive circuit can also have other structures, which will not be detailed here.

Further, in the in-cell touch screen panel according to an embodiment of the disclosure, the reference signal terminal can be connected to a common electrode, which can be grounded or not, and this is not be limited here.

In the above-mentioned in-cell touch screen panel according to an embodiment of the disclosure, the touch control read circuit 212 includes a switch transistor T2, as illustrated in FIG. 4, for example.

A source electrode of the switch transistor T2 is used as the input terminal of the touch control read circuit 212, a gate electrode of the switch transistor T2 is the control terminal of the touch control read circuit 212, and a drain electrode of the switch transistor T2 is used as the output terminal of the touch control read circuit 212.

According to an embodiment of the disclosure, when the switch transistor T2 is converted from off-state to on-state under a control of a corresponding dermatoglyphics touch control scan line Scan, an identification signal output from the photosensitive circuit 211 is output to the dermatoglyphics touch control read line Read, and the controller can carry out a dermatoglyphics identification function by processing the identification signal on the dermatoglyphics touch control read line Read.

According to an embodiment of the disclosure, respective components of the photosensitive transistor as the touch control read circuit can be prepared in the same layers as respective components of a switch transistor of a sub-pixel of the touch screen panel. In such a way, for the manufacturing for the touch control read circuit and the display panel, any new preparing processes may not be needed, and the in-cell touch control screen panel can be implemented by only modifying corresponding patterning of each layer, without requiring any new additional preparing processes, which saves production cost and improves production efficiency. Of course, the touch control read circuit may also have other structures, which will not be elaborated here.

Figure 5:
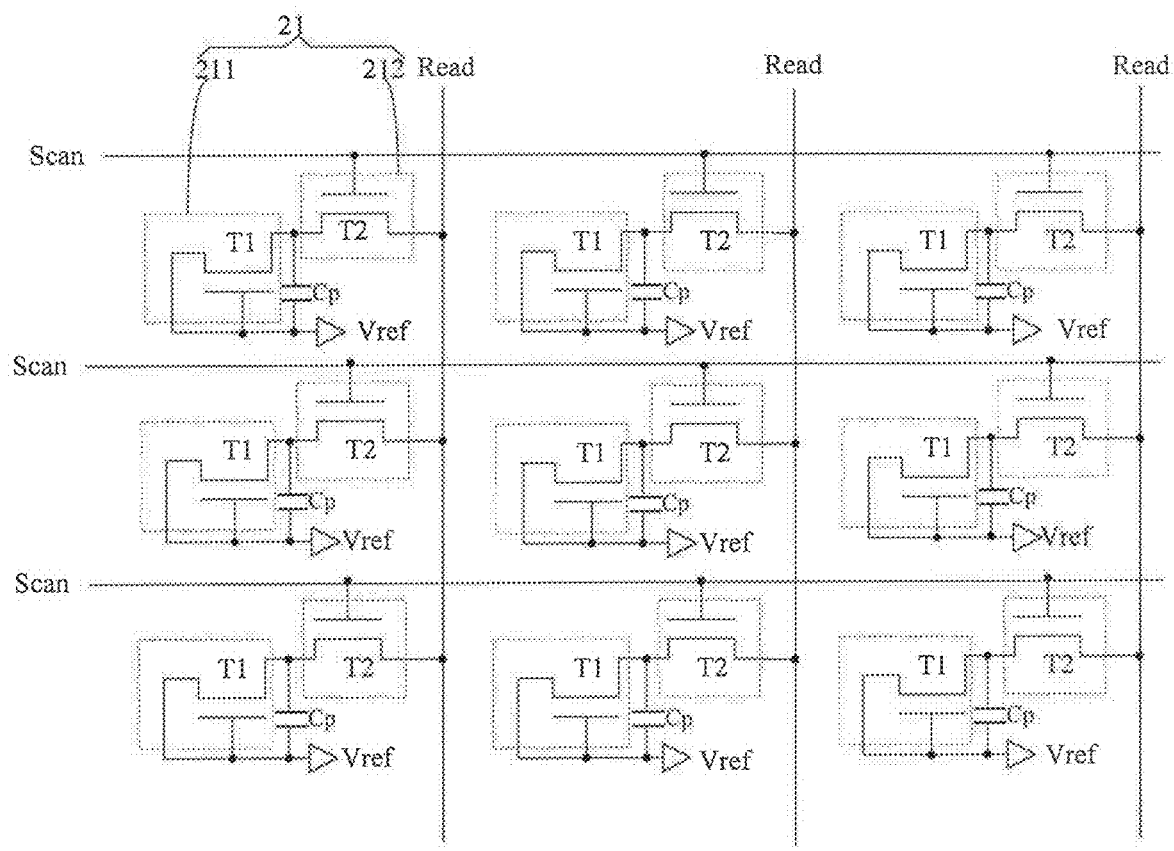
FIG. 5 is a schematic structural diagram of a dermatoglyphics identification circuit of the in-cell touch screen panel according to still another embodiment of the disclosure.

In the above-mentioned in-cell touch screen panel according to the embodiment of the disclosure, the photosensitive touch control circuit 21 may further include a capacitor Cp, as illustrated in FIG. 5.

A terminal of the capacitor Cp is connected with the output terminal of the photosensitive circuit 211 and the input terminal of the touch control read circuit 212 respectively, and the other terminal of the capacitor Cp is connected with the reference signal terminal Vref. The capacitor Cp is configured to hold the identification signal generated by the photosensitive circuit 211 on the input terminal of the touch control read circuit 212 for a longer time period, in order to ensure that the touch control read circuit 212 can more stably output the received identification signal to the dermatoglyphics touch control read line Read, when the dermatoglyphics scan signal is received on the corresponding dermatoglyphics touch control scan line Scan.

According to an embodiment of the disclosure, the dermatoglyphics touch control read lines can be arranged between adjacent columns of sub-pixels (for displaying) of the touch screen panel. Further, the respective dermatoglyphics touch control read lines and the respective data signal lines of the touch screen panel can be arranged in a same layer and are insulated from each other. Thus, the respective dermatoglyphics touch control read lines which are insulated from the respective data signal lines can be prepared while the respective data lines are prepared, that is, they can be formed together. In such a way, patterns of the data signal lines and patterns of the dermatoglyphics touch control read lines are formed by same one or more patterning processes when the touch screen panel is prepared, without requiring any new preparing processes, which saves preparation cost. Of course, the dermatoglyphics touch control read lines and the data signal lines can be prepared separately, and this will not be limited here.

Similarly, according to an embodiment of the disclosure, the dermatoglyphics touch control scan lines can be arranged between adjacent rows of sub-pixels of the touch screen panel. Similarly, the respective dermatoglyphics touch control scan lines and the respective gate signal lines of the touch screen panel can be arranged in a same layer and are insulated from each other. Thus, the respective dermatoglyphics touch control scan lines which are insulated from the respective gate signal lines are prepared while the respective gate lines are prepared, that is, they can be formed together. In such a way, any additional preparing processes will not be added when the touch screen panel is prepared, and patterns of the gate signal line and patterns the dermatoglyphics touch control scan line are formed by same one or more patterning processes, which saves preparation costs and promotes production additive value. Of course, the dermatoglyphics touch control scan lines and the gate signal lines can be prepared separately, and this will not be limited here.

Figure 6:
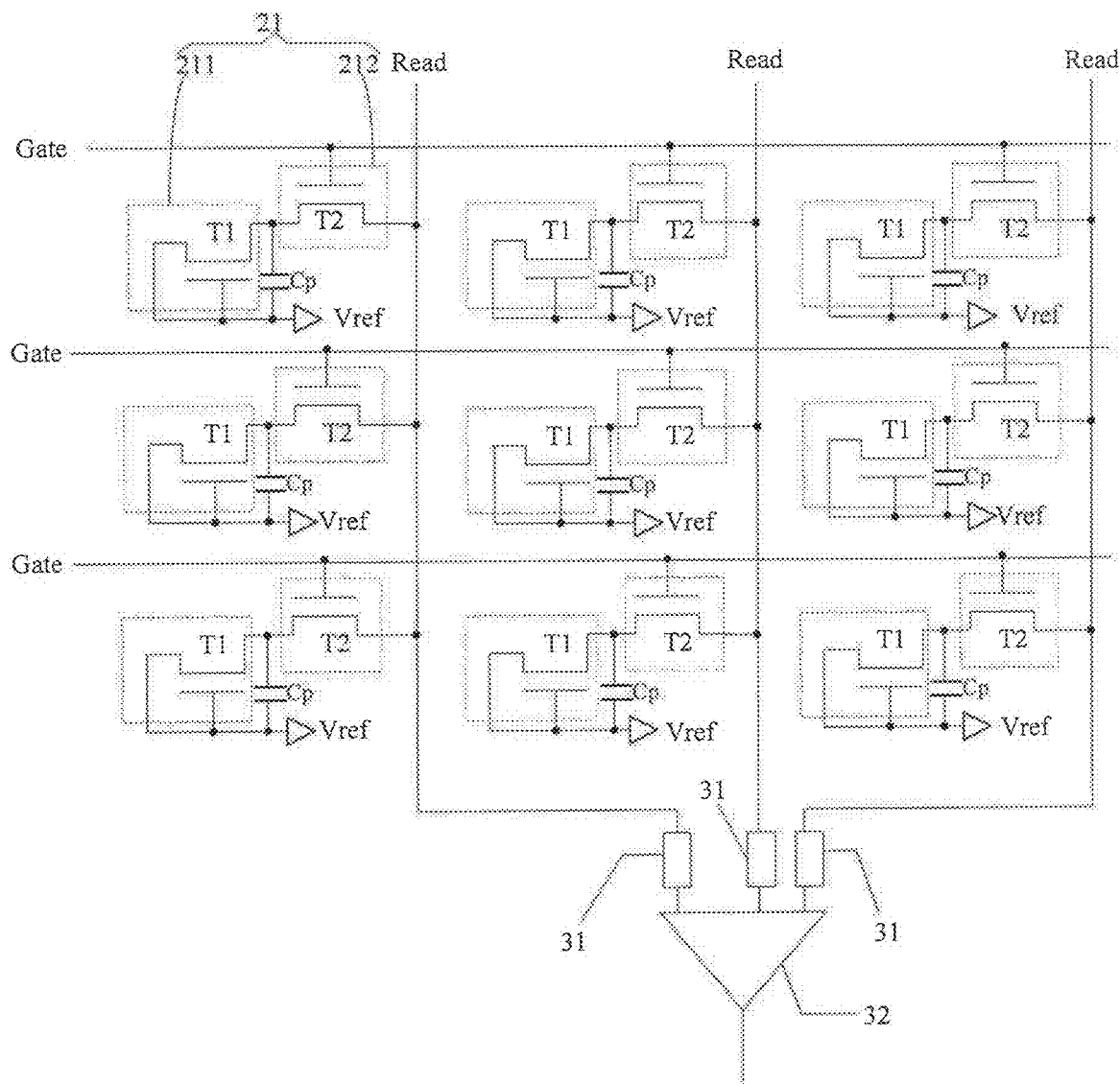
FIG. 6 is a schematic structural diagram of a dermatoglyphics identification circuit of the in-cell touch screen panel according to yet still another embodiment of the disclosure.

In the in-cell touch screen panel according to an embodiment of the disclosure, as illustrated in FIG. 6, at least one of the gate signal lines Gate of the touch screen panel can be used as one dermatoglyphics touch control scan line, which configuration can avoid arranging new wirings in the touch screen panel and will allow the touch screen panel to have a larger aperture ratio. Furthermore, in the example, the gate signal lines Gate are reused as the dermatoglyphics touch control lines, which will further avoid adding an individual driving chip IC to separately control the dermatoglyphics touch control scan lines, which saves preparation cost.

According to the in-cell touch screen panel of an embodiment of the disclosure, an example of the controller can include a region determination circuit, a signal output circuit, and a signal process circuit.

The region determination circuit is configured to determine the dermatoglyphics scan region according to the touch control position, after the touch control position is determined by the capacitive touch control circuit. Further, in at least one example, the region determination circuit is configured to, according to the signal amount distribution of the touch signal generated by the dermatoglyphics contact in the touch region, select the touch center region in the touch region and select the characteristic region in the touch center region, and configured to determine the characteristic region as the dermatoglyphics scan region.

The signal output circuit is configured to output the dermatoglyphics scan signal to the dermatoglyphics touch control scan lines of the dermatoglyphics scan region.

The signal process circuit is configured to process the identification signal output from the dermatoglyphics touch control read lines of the dermatoglyphics scan region.

According to the in-cell touch screen panel of the embodiment of the disclosure, in an example, the signal process circuit is configured to compare the identification signal output from each of the dermatoglyphics touch control read lines in a determined dermatoglyphics scan region with the identification signal output from its immediately preceding adjacent dermatoglyphics touch control read line, for example, and amplify the signal difference obtained from the comparison; or, the signal process circuit is configured to compare an identification signal output from each of the dermatoglyphics touch control read lines in a determined dermatoglyphics scan region with an identification signal output from its immediately following adjacent dermatoglyphics touch control read line, for example, and amplify the signal difference obtained from the comparison. Thus relative positions of a concave point and a convex point can be determined and defined.

According to an embodiment of the disclosure, for example, the signal process circuit includes at least one differential amplifier.

In the above-mentioned in-cell touch screen panel according to the embodiment of the present disclosure, at least two adjacent dermatoglyphics touch control read lines are defined as one group, and the dermatoglyphics touch control read lines belonging to the same group are connected with a same differential amplifier through a control switch. The identification signals on the dermatoglyphics touch control read lines which are needed to be compared are selected by the control switch.

For example, taking what is illustrated in FIG. 6 as an example, all the dermatoglyphics touch control read lines Read are defined as a group, and each of the dermatoglyphics touch control read lines Read belonging to the same group is connected with a same differential amplifier 32 through a corresponding control switch 31; and different dermatoglyphics touch control read lines Read may be connected to the same differential amplifier 32 through a different control switch 31.

Further, in the above-mentioned in-cell touch screen panel according to an embodiment of the disclosure, in an example, the signal process circuit is generally configured to generate a dermatoglyphics characteristic image from the identification signal on the dermatoglyphics touch control read line, and compare the generated dermatoglyphics characteristic image and a predetermined dermatoglyphics characteristic image which is prestored, so as to implement the function of identifying the dermatoglyphics.

Figure 7:
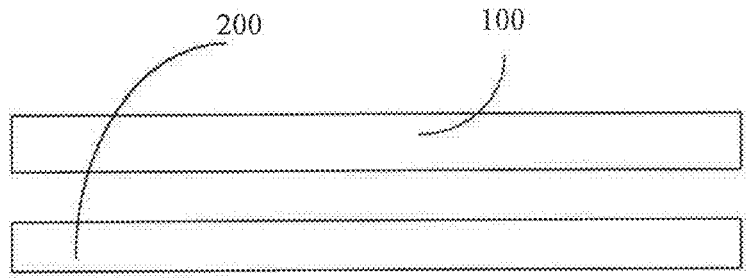
FIG. 7 is a schematic structural diagram of an in-cell touch screen panel according to another embodiment of the disclosure.

Further, in an example, the in-cell touch screen panel according to an embodiment of the disclosure includes a backlight circuit, and the backlight circuit includes a light guide plate, a light source (e.g., a dot-like light source such as an LED or a line-like light source such as a cold cathode fluorescent light), or other optical film, and is configured to provide light for the operation of the in-cell touch screen panel. As illustrated in FIG. 7, the backlight circuit 200 is disposed on the side of the in-cell touch screen panel 100, which side is opposite to the side of the in-cell touch screen panel for touching. The backlight circuit may be side-illuminating type or directly illuminating type.

Further, at least one embodiment of the disclosure provides a display device, and the display device includes any one of the dermatoglyphics data acquisition devices according to above-mentioned embodiments of the disclosure. The display device may be, a cell phone, a tablet computer, a TV set, a display device, a laptop computer, a digital frame, a navigator or any product or means having a display function. Embodiments of the display device can refer to above-mentioned embodiments of the in-cell touch screen panel, and repeated portions will not be elaborated here. It should be noted that the in-cell touch screen panel according to the embodiments of the present disclosure can be separately applied without a function of displaying images.

At least one embodiment of the embodiments of the disclosure provides a security system, and the system includes any one of the above-mentioned in-cell touch screen panel or any one of the above-mentioned display device. The security system can be used for a door or gate of a warehouse or an office, a safe storage box or tank, or the like.

Figure 8:
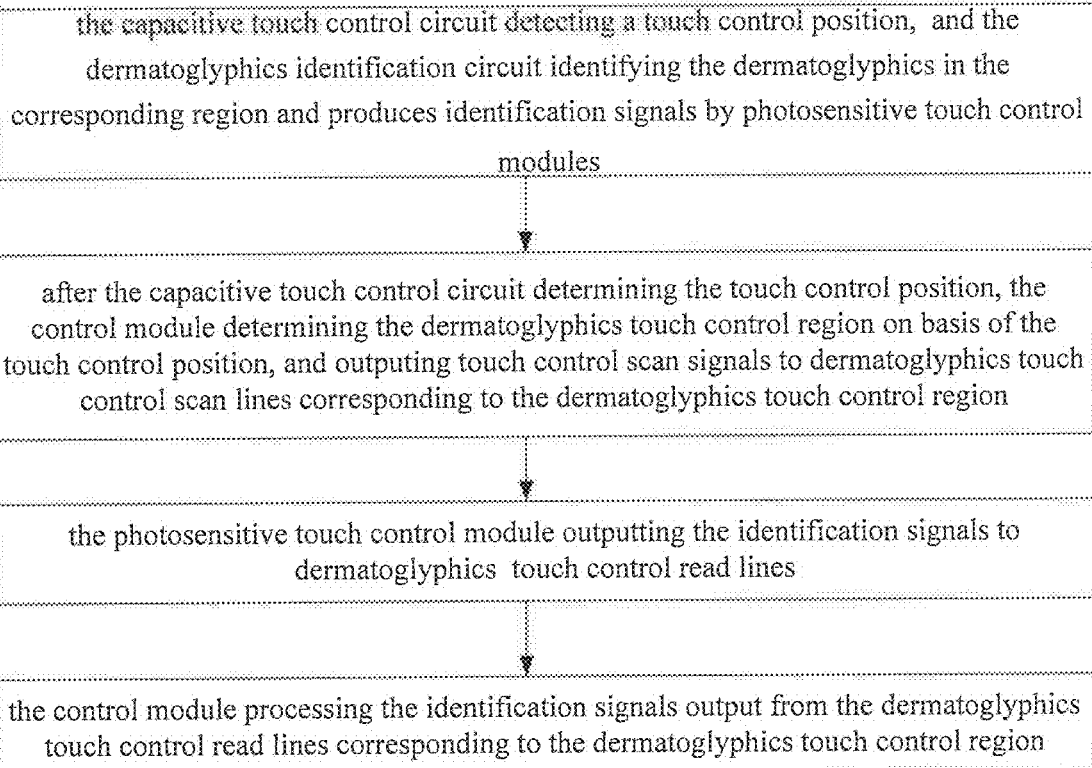
FIG. 8 is a flow chart of a method of driving the in-cell touch screen panel according to an embodiment of the disclosure.

At least one embodiment of the embodiments of the disclosure provides a method of driving any one of the above-mentioned in-cell touch screen panel, as illustrated in FIG. 8, including the following operations.

The operation of detecting a touch control position, wherein a capacitive touch control circuit is configured to determine the touch control position, and a dermatoglyphics identification circuit is configured to identify a dermatoglyphics in a corresponding region and generates an identification signal through the photosensitive touch control components of the dermatoglyphics identification circuit.

The operation of determining a dermatoglyphics scan region from the touch control position, wherein after the capacitive touch control circuit determines the touch control position, the controller determines the dermatoglyphics scan region from the touch control position, and outputs the dermatoglyphics scan signals to the dermatoglyphics touch control scan lines corresponding to the dermatoglyphics scan region.

The operation of identifying the dermatoglyphics in the dermatoglyphics scan region and generating identification signals, wherein the photosensitive touch control component identifies the dermatoglyphics in the dermatoglyphics scan region and generates the identification signals, and outputs the identification signals to the dermatoglyphics touch control read lines corresponding to the dermatoglyphics scan region.

The operation of processing the identification signals, wherein the controller is configured to process the identification signals output from the dermatoglyphics touch control read lines corresponding to the dermatoglyphics scan region.

Figure 9:
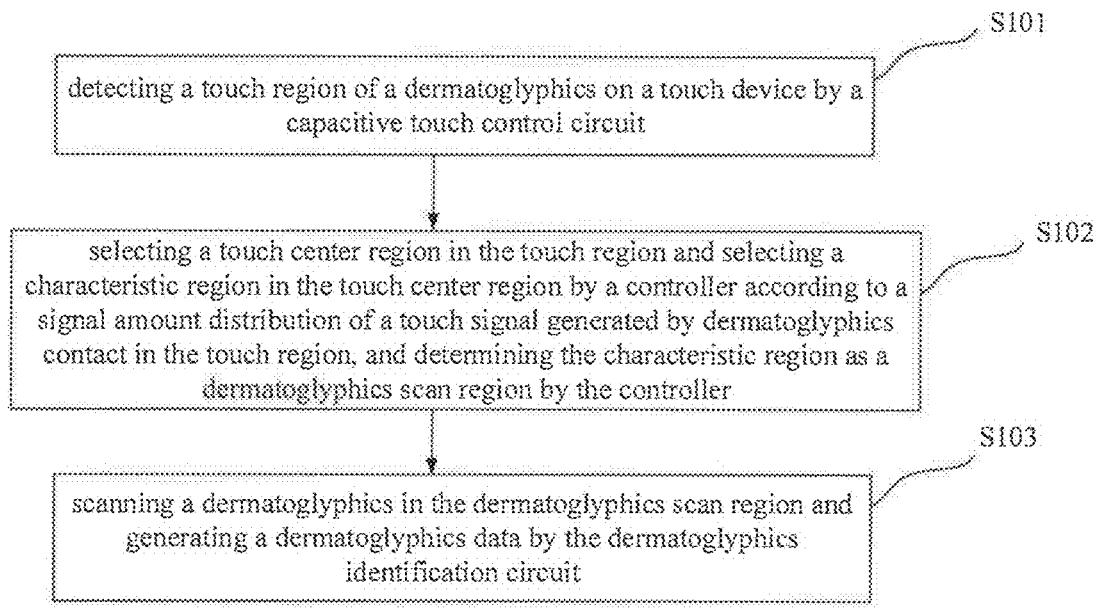
FIG. 9 is a flow chart of an acquisition method of dermatoglyphics data according to an embodiment of the disclosure.

At least one embodiment of the disclosure provides an acquisition method of dermatoglyphics data, as illustrated in FIG. 9, and the method includes the following steps.

Step S101: detecting a touch region of a dermatoglyphics on a touch device by a capacitive touch control circuit;

Step S102: selecting a touch center region in the touch region and selecting a characteristic region in the touch center region by a controller, according to a signal amount distribution of a touch signal generated by dermatoglyphics contact in the touch region, and determining the characteristic region as a dermatoglyphics scan region by the controller; and Step S103: scanning a dermatoglyphics in the dermatoglyphics scan region and generating the dermatoglyphics data by a dermatoglyphics identification circuit.

In the above-mentioned acquisition method of dermatoglyphics data according to the embodiments of the present disclosure, the dermatoglyphics scan region is a characteristic region, and the characteristic region is located in the touch region. In comparison with scanning the entire touch region, the area of the scanned characteristic region is smaller and the scanning speed is faster, which not only reduces the time for scanning or identifying the dermatoglyphics, but also reduces the power consumption of the device, and increases the recognition efficiency.

The above-mentioned acquisition method of dermatoglyphics data is described below by taking a method for acquiring dermatoglyphics data of a human palm as an example. It can be understood that the acquisition method of dermatoglyphics data is merely for illustration, and the acquisition method of dermatoglyphics data provided in the present disclosure can also be applied to other parts of the human limbs, such as feet, elbows, wrists, arms, legs, etc., which are not elaborated here.

Figure 10:
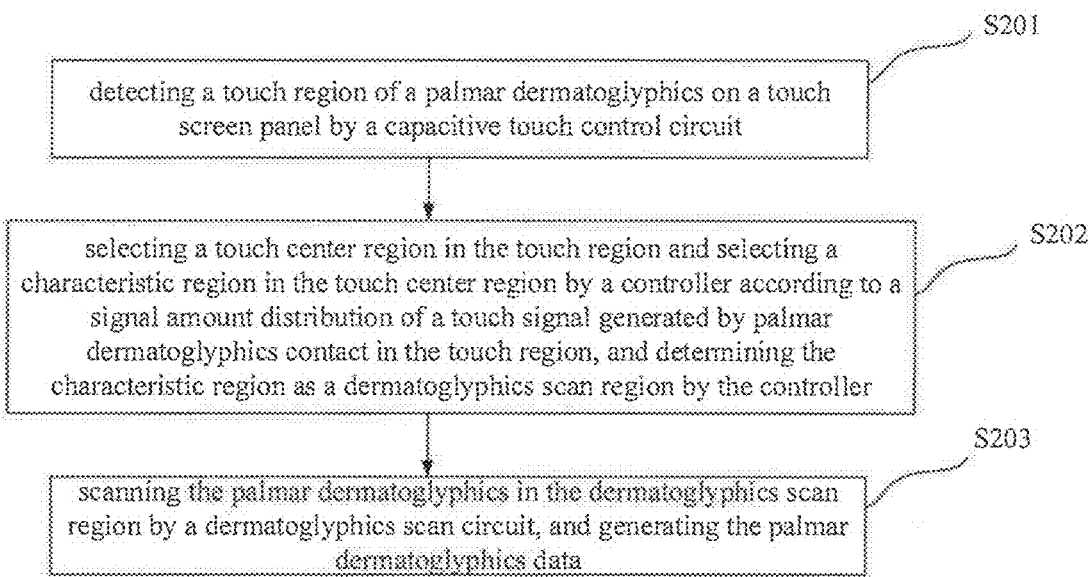
FIG. 10 is a flow chart of an acquisition method of palm dermatoglyphics data according to an embodiment of the disclosure.

FIG. 10 is a flow chart of an acquisition method of dermatoglyphics data of a palm according to an embodiment of the disclosure. Referring to FIG. 10, the acquisition method of dermatoglyphics data of a palm according to an embodiment of the disclosure includes following steps.

Step S201: detecting a touch region of a palmar dermatoglyphics on a touch screen panel by a capacitive touch control circuit.

In at least some embodiments, the touch screen panel adopts the dermatoglyphics data acquisition device described in above-mentioned embodiments (for example, an in-cell touch screen panel). In the in-cell touch screen panel provided by the present disclosure, the capacitive touch control circuit may be of mutual capacitive type or self-capacitive type. In a case where the capacitive touch control circuit is of mutual capacitive type, capacitive touch control electrodes include touch control driving electrodes and touch control sensing electrodes. In a case where the capacitive touch control circuit is of self-capacitive type, the capacitive touch control electrodes only include self-capacitive electrodes. In the embodiment of the present disclosure, an in-cell touch screen panel using self-capacitive touch control electrodes is taken as an example to specifically describe the acquisition method of dermatoglyphics data of a palm.

Figure 11:
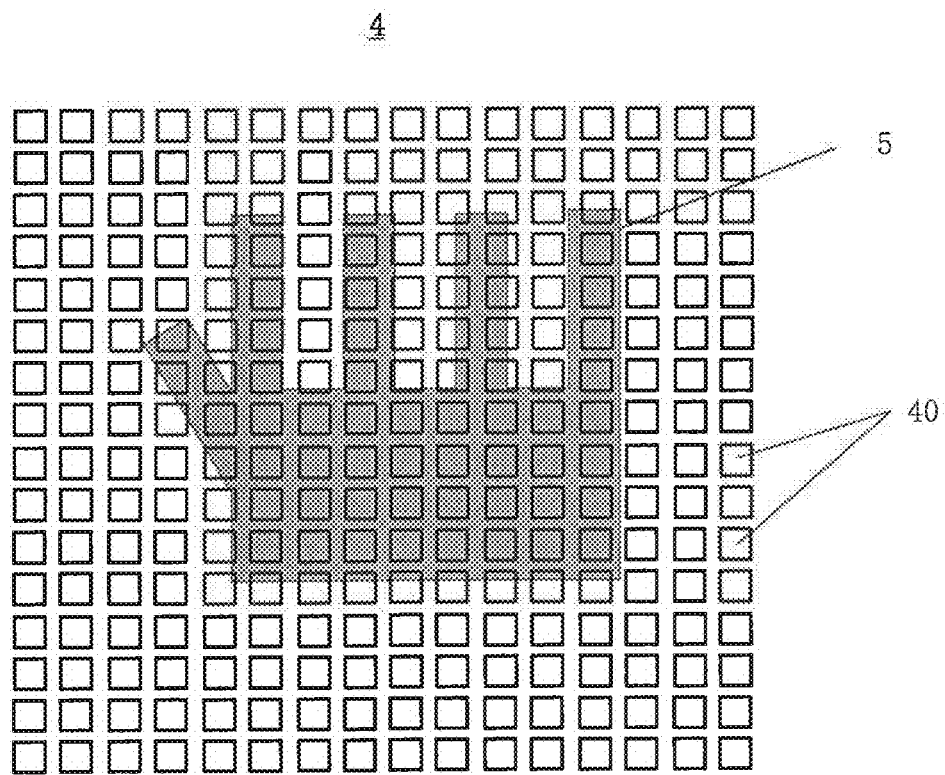
FIG. 11 is a schematic diagram of an in-cell touch screen panel and a touch region of a hand according to an embodiment of the disclosure.
Figure 12:
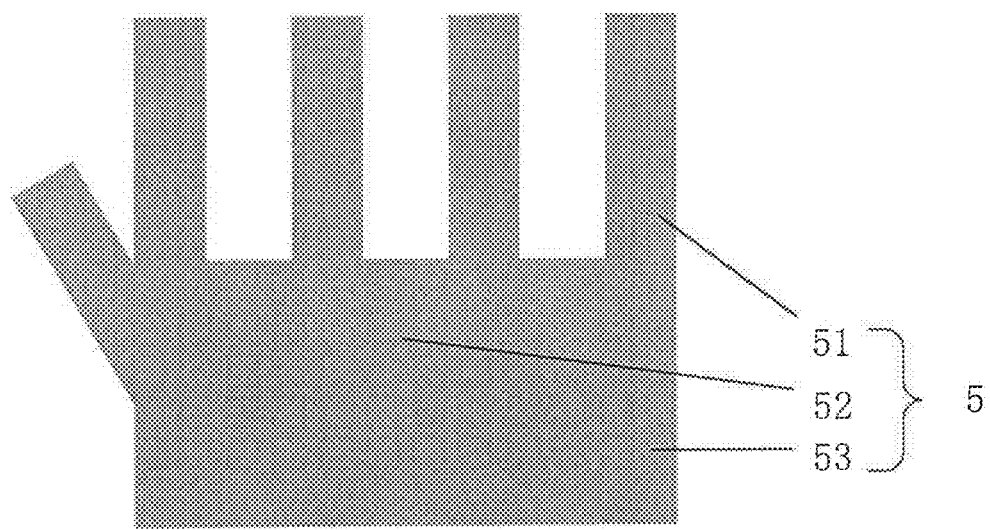
FIG. 12 is a schematic diagram of a hand according to an embodiment of the disclosure.
Figure 13:
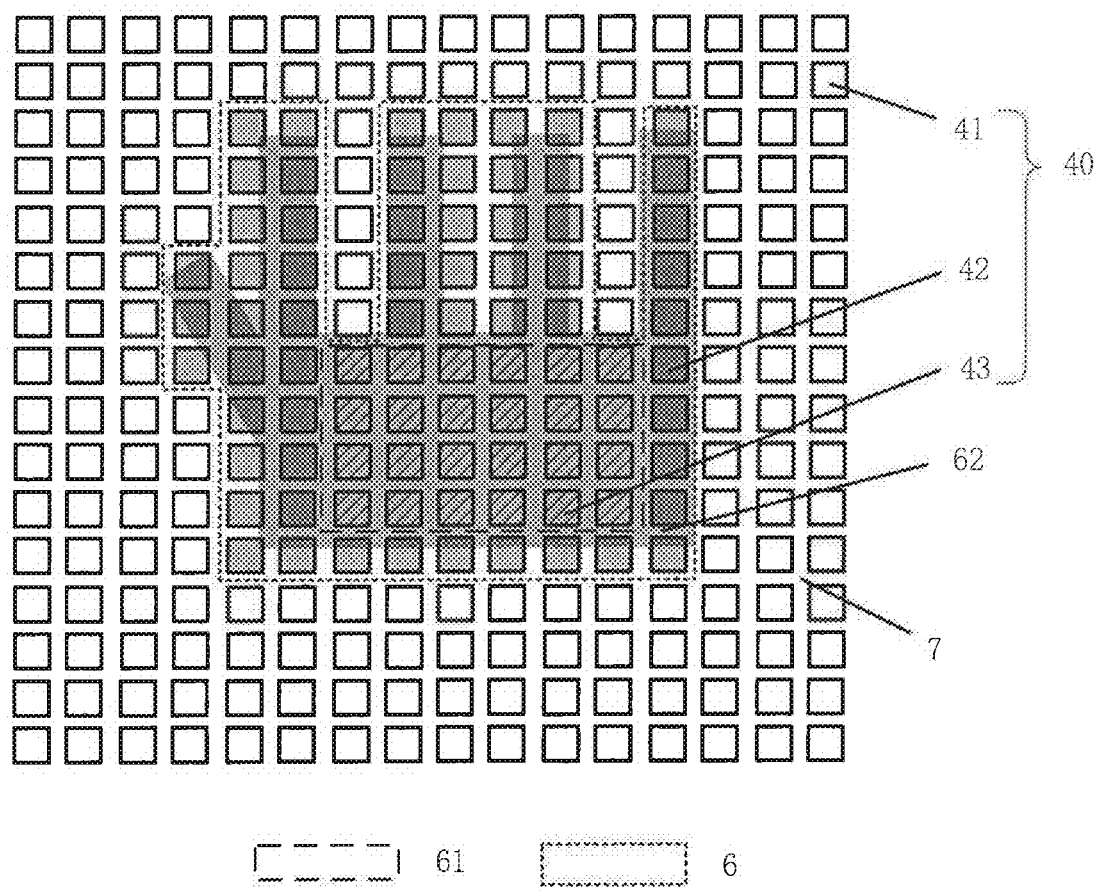
FIG. 13 is a schematic diagram of an in-cell touch screen panel and a signal amount distribution of a touch signal in a touch region of a hand according to an embodiment of the disclosure.

FIG. 11 is a schematic diagram of an in-cell touch screen panel and a touch region of a hand according to an embodiment of the disclosure. FIG. 12 is a schematic diagram of a hand according to an embodiment of the disclosure. FIG. 13 is a schematic diagram of an in-cell touch screen panel and a signal amount distribution of a touch signal in a touch region of a hand according to an embodiment of the disclosure. As illustrated in FIG. 11, the touch screen panel 4 includes a plurality of self-capacitive touch control electrodes 40 arranged in a matrix. As illustrated in FIG. 12 and FIG. 13, when a hand 5 touches the touch screen panel 4, the self-capacitive touch control electrodes 42 and 43 in the touch region 6 between the hand 5 and the touch screen panel 4 both generate touch signals, and in the non-touch region 7 (that is, the region other than the touch region 6 in the touch screen panel 4 of FIG. 13) where the hand 5 does not touch the touch screen panel 4, the self-capacitive touch control electrode 41 does not generate the touch signal. In this way, the touch region 6 of the hand 5 on the touch screen panel can be detected, according to the region where the self-capacitive touch control electrodes that generate the touch signals on the touch screen panel 4 are located.

Step S202: selecting a touch center region in the touch region and selecting a characteristic region in the touch center region by a controller, according to a signal amount distribution of a touch signal generated by palmar dermatoglyphics contact in the touch region, and determining the characteristic region as a dermatoglyphics scan region by the controller.

When the hand touches the touch screen panel, different parts of the hand (such as the fingers, the center of the palm, and the edge of the palm) have different degrees of contact on the touch screen panel. The reasons include, for example, different pressing pressures, different distances between the surface of the hand and the touch screen panel, and thus the signal amount of the touch signal generated in the touch region is also different. In the embodiments of the present disclosure, according to the signal amount distribution, the touch center region is selected from the touch region, and then the characteristic region is selected from the touch center region.

In at least some embodiments, the dermatoglyphics contact generates a first signal amount of a first touch signal in the touch center region, the dermatoglyphics contact generates a second signal amount of the first touch signal in the touch edge region, and the first signal amount is not equal to the second signal amount. Hence, according to the distribution of the first signal amount of the first touch signal and the second signal amount of the first touch signal, the touch center region can be determined in the touch region. By selecting the touch center region in the touch region, it is beneficial to reduce the dermatoglyphics scan region, reduce the time for scanning or identifying the dermatoglyphics, and reduce the power consumption of the device.

Similarly, the dermatoglyphics contact generates a third signal amount of a second touch signal in the characteristic region, the dermatoglyphics contact generates a fourth signal amount of the second touch signal in the non-characteristic region, and the third signal amount is not equal to the fourth signal amount. Hence, according to the distribution of the third signal amount of the second touch signal and the fourth signal amount of the second touch signal, the characteristic region can be determined in the touch center region. By selecting the characteristic region in the touch center region, the dermatoglyphics scan region is further reduced, and the touch scan time is shortened.

In the embodiments of the present disclosure, a specific region (such as the above-mentioned touch center region and/or the characteristic region) may be selected according to the signal amount distribution of the electrical touch signal generated by the electrical touch scan (for example, achieved by the capacitive touch control electrode). And the above-mentioned specific region (for example, the touch center region and/or the characteristic region) may also be selected according to the signal amount distribution of the optical touch signal generated by the optical touch scan (for example, achieved by the above-mentioned photosensitive touch control component). According to actual needs, the touch center region and the characteristic region may be selected by using the same touch scan method, or different touch scan methods.

In at least some embodiments, the first touch signal and the second touch signal are the same touch signal. That is, the same touch scan method is used to select both the touch center region and the characteristic region, which can reduce the switching operation between various touch scan modes, reduce the device power consumption, and shorten the touch scan time. In this case, a difference between the first signal amount and the second signal amount is larger than a difference between the third signal amount and the fourth signal amount. This is because, in a case where filtering is performed on the signal amount of the same touch signal in the touch region, the difficulty of filtering the signals may increase if the difference between the first signal amount and the second signal amount is less than or equal to the difference between the third signal amount and the fourth signal amount, thereby causing a deviation and failing to accurately sense the characteristic region or the touch center region.

For example, in a case where the first touch signal and the second touch signal are electrical touch signals, the above-mentioned Step 202 includes: scanning the dermatoglyphics in contact with the touch region by using an electrical touch scan method to generate the electrical touch signal, and selecting the touch center region and the characteristic region according to a signal amount distribution of the electrical touch signal in the touch region. For example, the electrical touch signal is any one of capacitance, current, and voltage. Further, a first signal amount of the electrical touch signal in the touch center region is less than a second signal amount of the electrical touch signal in the touch edge region, and a third signal amount of the electrical touch signal in the characteristic region is less than a fourth signal amount of the electrical touch signal in the non-characteristic region.

For example, as illustrated in FIG. 12 and FIG. 13, while the hand 5 touches the touch screen panel 4, the touch signals generated in different parts of the hand 5 are different from one another. For example, the contact degrees of the finger 51, the palm center portion 52, and the palm edge portion 53 on the touch screen panel 4 are different from one another, and thus the signal amounts of touch signals generated in the touch region 6 are also different. Because the palm center portion 52 is recessed with respect to the palm edge portion 53, the palm center portion 52 cannot be in close contact with the region of the touch screen panel 4 corresponding to the palm center portion 52, and the first signal amount of the electrical touch signal generated by the self-capacitive touch control electrode 43 in the region corresponding to the palm center portion 52 is less. In contrast, the palm edge portion 53 and the finger 51 are in close contact with the regions of the touch screen panel 4 corresponding to the palm edge portion 53 and the finger 51, and the second signal amount of the electrical touch signal generated by the self-capacitive touch control electrode 42 in this region is larger.

In the embodiments of the present disclosure, a region with a small signal amount is determined as the touch center region 61, and a region with a large signal amount is determined as the touch edge region 62. In specific implementation, the above-mentioned selection of the touch center region 61 can be achieved by setting a preset threshold of the signal amount. For example, the self-capacitive touch control electrode 43 in the touch center region 61 generates the first signal amount, and the self-capacitive touch control electrode 42 in the touch edge region 62 generates the second signal amount. As an example, the ratio range of the second signal amount and the first signal amount is from 2 to 4. For example, the signal amount of the self-capacitive touch control electrode 43 in the touch center region 61 ranges from 10,000 to 15,000 (the numbers used here are only used to indicate relative values, not absolute values), and the signal amount of the self-capacitive touch control electrode 42 in the touch edge region 62 ranges from 30,000 to 40,000. The preset threshold of the signal amount is set to 20,000. The self-capacitive touch control electrode 43 having a signal amount less than the preset threshold is filtered out and an image is generated. Thus, the touch center region 61 is determined. In this way, according to the signal amount distribution of the electrical touch signals generated by the dermatoglyphics contact of the palm in the touch region, the touch center region can be selected in the touch region.

Figure 14:
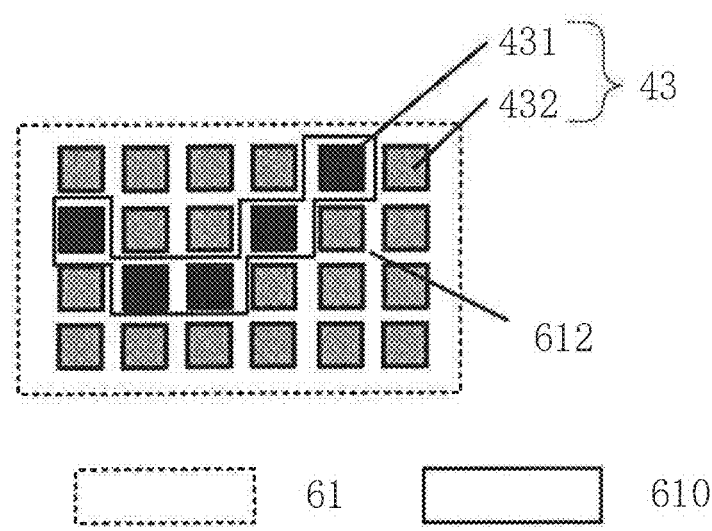
FIG. 14 is a schematic diagram of a signal amount distribution of a touch signal in a touch center region of a palm according to an embodiment of the disclosure.
Figure 15:
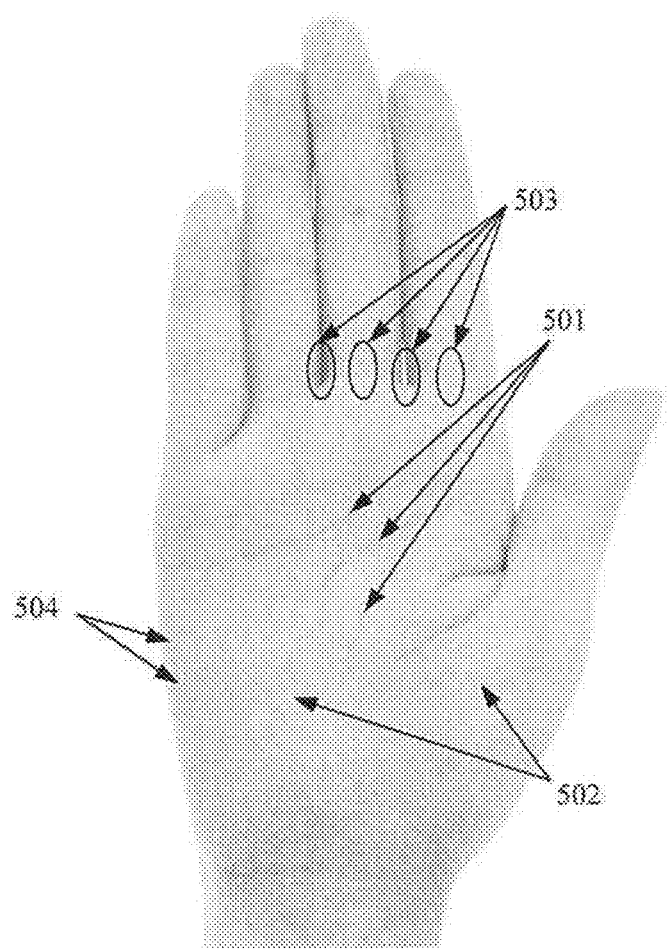
FIG. 15 is a schematic diagram of a dermatoglyphics of a palm according to an embodiment of the disclosure.

FIG. 14 is a schematic diagram of a signal amount distribution of a touch signal in a touch center region of a palm according to an embodiment of the disclosure. As illustrated in FIG. 14, the selected touch center region 61 corresponds to a plurality of self-capacitive touch control electrodes 43 arranged in 4*6. A person's palm has various types of palmar dermatoglyphics, including main-line patterns, wrinkles, mastoid striations, detail points and triangular points, etc. FIG. 15 is a schematic diagram of a palmar dermatoglyphics according to an embodiment of the disclosure. As illustrated in FIG. 15, the main-line patterns 501 are the thickest line patterns on the palm. Most palms have three main-line patterns, which are called life-line pattern, emotion-line pattern and wisdom-line pattern. The wrinkles 502 are thinner and shallower than the main-line patterns 501 and are very irregular. There is also mastoid striations 503 similar to the fingerprint on the palm, which is located near the base of each finger of the palm. The triangular point is a center point of a triangular region formed by the mastoid striations 503 on the palm. These triangular regions are located below the base of the finger. In addition, the palmar dermatoglyphics also includes a plurality of detail points 504. Main-line patterns and wrinkles are important features of palm dermatoglyphics and can be extracted from low-resolution, lower-quality images, and the triangle points and the detail points can be extracted from high-resolution, high-quality images.

In the embodiments of the present disclosure, a characteristic region having three main-line patterns is taken as an example for description. However, a region having wrinkles or other personalized features such as a scar can also be selected as the characteristic region of the palm, and the process of selecting the characteristic region may be referred to the description as follows. Because there are valleys in the main-line pattern of the palm, the signal amounts of the 4*6 self-capacitive touch control electrodes 43 are actually different from one another. For example, because the texture on the main-line pattern has valleys and the texture at the valleys is not in close contact with the region of the touch screen panel 4 corresponding to the main-line pattern, the third signal amount of the electrical touch signal generated by the self-capacitive touch control electrode 431 in this region is less. In contrast, the palm 5 is in close contact with the region of the touch screen panel 4 outside the corresponding main-line pattern, so the fourth signal amount of the electrical touch signal generated by the self-capacitive touch control electrode 432 in this region is larger. In order to facilitate filtering, the region with less signal amount is determined as the characteristic region 610, and the region with larger signal amount is determined as the non-characteristic region 612. For example, the self-capacitive touch control electrode 431 in the characteristic region 610 generates the third signal amount, and the self-capacitive touch control electrode 432 in the non-characteristic region 612 generates the fourth signal amount. For example, the ratio range of the fourth signal amount and the third signal amount is from 1.09 to 1.33.

In specific implementation, the characteristic region 610 may be selected by setting a preset threshold of the signal amount. For example, the third signal amount of the electronic touch signal generated by the self-capacitive touch control electrode 431 in the characteristic region 610 ranges from 30,000 to 32000, and the fourth signal amount of the electronic touch signal generated by the self-capacitive touch control electrode 432 in the non-characteristic region 612 ranges from 35,000 to 40,000. The preset threshold of the signal amount is set to 34000. In this way, the self-capacitive touch control electrodes 431 having a signal amount less than the preset threshold can be filtered out and an image can be generated, thereby determining the characteristic region 610.

In the above embodiment, selecting the characteristic region 610 will help reduce the dermatoglyphics scan region, shorten the recognition time of the palmar dermatoglyphics, and increase the recognition speed of the palmar dermatoglyphics. In addition, the capacitive touch control electrode in this embodiment can identify not only the touch region 6 but also the characteristic area 610 of the palm 5, thereby reducing the switching time between the scanning modes and reducing the touch scan time.

For another example, in a case where the first touch signal and the second touch signal are optical touch signals, the above-mentioned Step 202 includes: scanning the dermatoglyphics in contact with the touch region by using an optical touch scan method to generate the optical touch signal, and selecting the touch center region and the characteristic region according to a signal amount distribution of the optical touch signal in the touch region. For example, the optical touch signal includes light intensity. Further, in at least one example, a first signal amount of the optical touch signal in the touch center region is larger than a second signal amount of the optical touch signal in the touch edge region, and a third signal amount of the optical touch signal is larger than a fourth signal amount of the optical touch signal in the non-characteristic region.

For example, after the touch region is determined, the photosensitive touch control components 21 of the in-cell touch screen panel as shown in FIG. 2 to FIG. 6 are used to scan the dermatoglyphics in the touch region to generate the optical touch signal. For the specific structure, the arrangement mode, and working principle of the photosensitive touch control components 21, reference may be made to the description in the above-mentioned embodiments, and details are not described herein again in the embodiments of the present disclosure, the light used to detect a touch is emitted from the back of the touch screen panel 4 to the front. While a hand touches the front of the touch screen panel 4, the palmar dermatoglyphics reflects part of the light back to the photosensitive touch control components. The photosensitive touch control component receives the reflected light and generates the optical touch signal.

Further, in the region where the palm is in close contact with the touch screen panel, part of the detection light is absorbed by the palm, the non-absorbed part is reflected back to the photosensitive touch control component, and the signal amount of the optical touch signal generated by the corresponding photosensitive touch control component is relatively less. In the region where the palm is not in close contact with the touch screen panel, the signal amount of the optical touch signal generated by the corresponding photosensitive touch control component is larger. Because there is an air gap between the palmar dermatoglyphics and the region of the touch screen panel that is not in close contact, the light which is not completely absorbed by the palm is reflected back to the photosensitive touch control component, so the optical signal amount generated in the region of the touch screen panel that is not in close contact is larger.

Referring to FIG. 13 and FIG. 14, in the embodiments of the present disclosure, in a case where the touch center region is selected according to the distribution of the optical touch signal, the region with larger signal amount of the optical touch signal is determined as the touch center region 61, and the region with less signal amount of the optical touch signal is determined as the touch edge region 62. Because the main-line pattern cannot be in close contact with the touch screen panel 4 due to that the main-line pattern of the palm has valleys, most of the light under the corresponding valleys are reflected back to the photosensitive touch control component, as a result, the signal amount of the optical touch signal generated by the corresponding photosensitive touch control component is larger, and signal amount of the optical touch signal in other regions is relatively less. Hence, in this embodiment, the region with larger signal amount of the optical touch signal is determined as the characteristic region 610, and the region with less signal amount of the optical touch signal is determined as the non-characteristic region 612.

In at least some embodiments, the first touch signal and the second touch signal are different types of touch signals. That is, different touch scan methods are used to determine the touch center region and the characteristic region, so that the advantages of each touch scan method can be used to increase the accuracy of touch scan.

For example, in a case where the first touch signal is an electrical touch signal and the second touch signal is an optical touch signal, the above-mentioned Step 202 includes: scanning the dermatoglyphics in contact with the touch region by using an electrical touch scan method to generate the electrical touch signal, and selecting the touch center region in the touch region according to a signal amount distribution of the electrical touch signal in the touch region; and scanning the dermatoglyphics in contact with the touch center region by using an optical touch scan method to generate the optical touch signal, and selecting the characteristic region in the touch center region according to a signal amount distribution of the optical touch signal in the touch center region. For example, the process of selecting the touch center region according to the signal amount distribution of the electrical touch signal in the above-mentioned embodiment, and the process of selecting the characteristic region according to the signal amount distribution of the optical touch signal in the above-mentioned embodiment can be referred to, and details are not described herein again.

For another example, in a case where the first touch signal is an optical touch signal and the second touch signal is an electrical touch signal, the above-mentioned Step 202 includes: scanning the dermatoglyphics in contact with the touch region by using an optical touch scan method to generate the optical touch signal, and selecting the touch center region in the touch region according to a signal amount distribution of the optical touch signal in the touch region; and scanning the dermatoglyphics in contact with the touch center region by using an electrical touch scan method to generate the electrical touch signal, and selecting the characteristic region in the touch center region according to a signal amount distribution of the electrical touch signal in the touch center region. For example, the process of selecting the touch center region according to the signal amount distribution of the optical touch signal in the above-mentioned embodiment, and the process of selecting the characteristic region according to the signal amount distribution of the electrical touch signal in the above-mentioned embodiment can be referred to, and details are not described herein again, Step S203: scanning the palmar dermatoglyphics in the dermatoglyphics scan region by a dermatoglyphics scan circuit, and generating the palmar dermatoglyphics data.

For example, as illustrated in FIG. 14, the photosensitive touch control components of the in-cell touch screen panel are used to scan the palmar dermatoglyphics in the characteristic region 610 to obtain the palmar dermatoglyphics data including detail information of the main-line patterns in the region.

In the acquisition method of dermatoglyphics data according to the embodiments of the present disclosure, the characteristic region is selected as the dermatoglyphics scan region, and the characteristic region is located in the touch region. Hence, compared to scanning the entire touch region, the area of the scanned characteristic region is smaller and the scanning speed is faster, which not only reduces the time to scan or identify the dermatoglyphics, but also reduces the power consumption of the device, and increases the recognition efficiency.

Optionally, after Step S102 and before Step S103, the acquisition method in the embodiment of the present disclosure further includes: scanning again the dermatoglyphics in contact with the touch center region by using a touch scan method different from that used while the characteristic region is selected; and confirming the selected characteristic region as the dermatoglyphics scan region again according to a signal amount distribution of the touch signal obtained.

In this way, the accuracy and security of dermatoglyphics recognition can be further increased through the secondary confirmation step.

For example, after scanning the palmar dermatoglyphics that is in contact with the touch center region by using one of the optical touch scan method and the electrical touch scan method and selecting the characteristic region, the acquisition method further includes: scanning again the dermatoglyphics that is in contact with the touch center region by using the other one of the optical touch scan method and the electrical touch scan method; and confirming the selected characteristic region as the dermatoglyphics scan region according to a signal amount distribution of the touch signal obtained.

In at least some embodiments, the dermatoglyphics data is acquired by using any of the above-mentioned in-cell touch screen panels. For example, the acquisition method of dermatoglyphics data in the embodiment of the present disclosure includes:

detecting a touch region of a dermatoglyphics on the touch screen panel by a capacitive touch control circuit;

scanning the dermatoglyphics in the touch region by using the capacitive touch control circuit or photosensitive touch control components; selecting the touch center region in the touch region and selecting the characteristic region in the touch center region by a controller according to the signal amount distribution of the touch signal generated by dermatoglyphics contact in the touch region, and determining the characteristic region as the dermatoglyphics scan region by a controller; outputting the dermatoglyphics scan signals to the dermatoglyphics touch control scan lines corresponding to the dermatoglyphics scan region;

identifying the dermatoglyphics in the dermatoglyphics scan region and generating the identification signals by the photosensitive touch control components, and outputting the identification signals to the dermatoglyphics touch control read lines; and processing the identification signals output from the dermatoglyphics touch control read lines corresponding to the dermatoglyphics scan region by the controller.

The embodiments of the disclosure provide a dermatoglyphics data acquisition device, an acquisition method of dermatoglyphics data, and a display device. For example, the dermatoglyphics data acquisition device is an in-cell touch screen panel, and the in-cell touch screen panel includes a capacitive touch control circuit, a dermatoglyphics identification circuit and a controller. The capacitive touch control circuit is configured to determine a touch control position. The dermatoglyphics identification circuit is configured to identify a dermatoglyphics in a corresponding region and generate identification signals by photosensitive touch control components, and when the dermatoglyphics scan signals are received on the dermatoglyphics touch control scan lines connected with the photosensitive touch control components, the photosensitive touch control components output the identification signal to dermatoglyphics touch control read lines. The controller is configured to determine a dermatoglyphics scan region according to the touch control position after the capacitive touch control circuit determines the touch control position, and outputs the dermatoglyphics scan signals to dermatoglyphics touch control read lines corresponding to the dermatoglyphics scan region. The controller is further configured to process the identification signals output from the dermatoglyphics touch control read lines corresponding to the dermatoglyphics scan region. Thus, under control of the controller, the operations of dermatoglyphics touch control scan and the signal process are conducted with respect to only the dermatoglyphics scan region corresponding to the touch control position determined by the dermatoglyphics identification circuit, so that the time for dermatoglyphics touch control scan and the amount of data to be processed can be reduced and in turn the time and power consumption for identifying a dermatoglyphics is further reduced.

What is described above is related to the illustrative embodiments of the disclosure only and not limitative to the scope of the disclosure. The scopes of the disclosure are defined by the accompanying claims.

What is claimed is:

1. A dermatoglyphics data acquisition device, comprising:
a capacitive touch control circuit, configured to detect a touch region of a dermatoglyphics on a touch device;
a controller, configured to select a touch center region in the touch region and select a characteristic region in the touch center region, according to a signal amount distribution of a touch signal generated by dermatoglyphics contact in the touch region, and determine the characteristic region as a dermatoglyphics scan region; and
a dermatoglyphics identification circuit, configured to scan a dermatoglyphics in the dermatoglyphics scan region and generate a dermatoglyphics data,
wherein a first signal amount of a first touch signal is generated in a first region of the touch region, and a second signal amount of the first touch signal is generated in a second region of the touch region,
wherein the touch region further comprises a touch edge region, the controller is further configured to determine the first region as the touch center region in the touch region and to determine the second region as the touch edge region according to the first signal amount and the second signal amount,
wherein the first signal amount is not equal to the second signal amount,
wherein a third signal amount of a second touch signal is generated in a third region of the touch region and a fourth signal amount of a second touch signal generated in a fourth region of the touch region,
wherein the touch center region further comprises a non-characteristic region, the controller is further configured to determine the fourth region as the characteristic region in the touch center region, the third region is the non-characteristic region, and
wherein the third signal amount is not equal to the fourth signal amount.

2. The acquisition device according to claim 1, wherein the capacitive touch control circuit comprises a plurality of capacitive touch control electrodes arranged in a matrix and a touch control detection chip;
the touch control detection chip is electrically connected with each of the capacitive touch control electrodes, and is configured to determine the touch region by detecting variation of capacitance of the capacitive touch control electrodes;
the controller is further configured to send a dermatoglyphics scan signal to the dermatoglyphics identification circuit;
the dermatoglyphics identification circuit is further configured to scan the dermatoglyphics in the dermatoglyphics scan region to generate an identification signal in response to the dermatoglyphics scan signal, and send the identification signal to the controller; and
the controller is further configured to process the identification signal.

3. The acquisition device according to claim 2, wherein the dermatoglyphics identification circuit comprises a plurality of photosensitive touch control components, a plurality of dermatoglyphics touch control scan lines, and a plurality of dermatoglyphics touch control read lines,
the photosensitive touch control components are arranged in a matrix, each of the capacitive touch control electrodes corresponds to some of the photosensitive touch control components, the respective dermatoglyphics touch control scan lines are connected with respective rows of photosensitive touch control components correspondingly, and the respective dermatoglyphics touch control read lines are connected with respective columns of photosensitive touch control components correspondingly.

4. The acquisition device according to claim 3, wherein the controller is connected with the capacitive touch control circuit, the dermatoglyphics touch control scan lines, and the dermatoglyphics touch control read lines respectively;
the controller is further configured to output the dermatoglyphics scan signal to the dermatoglyphics touch control scan lines corresponding to the dermatoglyphics scan region;
the photosensitive touch control components output the identification signal to the dermatoglyphics touch control read lines upon receiving the dermatoglyphics scan signal through the dermatoglyphics touch control scan lines; and
the controller is further configured to read the identification signal through the dermatoglyphics touch control read lines.

5. The acquisition device according to claim 3, wherein each of the photosensitive touch control components comprises a photosensitive circuit and a touch control read circuit;
the photosensitive circuit is configured to generate the identification signal upon receiving light which is emitted from a light source and is reflected to the photosensitive circuit when skin touches a touch screen panel, and provide the identification signal to the touch control read circuit; and
the touch control read circuit is configured to connect with a corresponding dermatoglyphics touch control scan line, and output the identification signal to a corresponding dermatoglyphics touch control read line upon the dermatoglyphics scan signal being received over the corresponding dermatoglyphics touch control scan line.

6. The acquisition device according to claim 5, wherein each of the photosensitive touch control components further comprises a capacitor, one terminal of the capacitor is connected with a junction between an output terminal of the photosensitive circuit and an input terminal of the touch control read circuit, and the other terminal of the capacitor is connected with a reference signal terminal.

7. The acquisition device according to claim 5, wherein at least one of gate signal lines of the touch screen panel is configured to be at least one of the dermatoglyphics touch control scan lines.

8. The acquisition device according to claim 5, wherein the controller comprises:
a region determination circuit, configured to select the touch center region in the touch region and select the characteristic region in the touch center region, according to the signal amount distribution of the touch signal generated by the dermatoglyphics contact in the touch region, and determine the characteristic region as the dermatoglyphics scan region;

a signal output circuit, configured to output the dermatoglyphics scan signal to the dermatoglyphics touch control scan lines corresponding to the dermatoglyphics scan region; and a signal process circuit, configured to process the identification signal output from the dermatoglyphics touch control read lines corresponding to the dermatoglyphics scan region.

9. The acquisition device according to claim 8, wherein the signal process circuit is configured to compare an identification signal output from one of the dermatoglyphics touch control read lines corresponding to the dermatoglyphics scan region with an identification signal output from its adjacent dermatoglyphics touch control read line, and to amplify a signal difference therebetween.

10. A display device, comprising the dermatoglyphics data acquisition device according to claim 1.

11. An acquisition method of a dermatoglyphics data, comprising:
    detecting a touch region of a dermatoglyphics on a touch device by a capacitive touch control circuit;
    selecting a touch center region in the touch region and selecting a characteristic region in the touch center region by a controller according to a signal amount distribution of a touch signal generated by dermatoglyphics contact in the touch region, and determining the characteristic region as a dermatoglyphics scan region by the controller; and
    scanning a dermatoglyphics in the dermatoglyphics scan region and generating the dermatoglyphics data by a dermatoglyphics identification circuit,
    wherein the touch region further comprises a touch edge region and the touch center region further comprises a non-characteristic region, and
    wherein the selecting the touch center region in the touch region and selecting the characteristic region in the touch center region by the controller according to the signal amount distribution of the touch signal generated by the dermatoglyphics contact in the touch region comprises:
    according to a first signal amount of a first touch signal generated in a first region of the touch region and a second signal amount of the first touch signal generated in a second region of the touch region, determining the first region as the touch center region in the touch region and the second region as the touch edge region, wherein the first signal amount is not equal to the second signal amount; and
    according to a third signal amount of a second touch signal generated in a third region of the touch region and a fourth signal amount of the second touch signal generated in a fourth region of the touch region, determining the fourth region as the characteristic region in the touch center region, the third region is the non-characteristic region, wherein the third signal amount is not equal to the fourth signal amount.

12. The acquisition method according to claim 11, wherein a ratio range of the second signal amount and the first signal amount is from 2 to 4, and a ratio range of the fourth signal amount and the third signal amount is from 1.09 to 1.33.

13. The acquisition method according to claim 11, wherein the first touch signal and the second touch signal are a same touch signal, and a difference between the first signal amount and the second signal amount is larger than a difference between the third signal amount and the fourth signal amount.

14. The acquisition method according to claim 13, wherein the first touch signal and the second touch signal are both electrical touch signals, the first signal amount of an electrical touch signal in the touch center region is less than the second signal amount of an electrical touch signal in the touch edge region, and the third signal amount of an electrical touch signal in the characteristic region is less than the fourth signal amount of an electrical touch signal in the non-characteristic region.

15. The acquisition method according to claim 13, wherein the first touch signal and the second touch signal are both optical touch signals, the first signal amount of an optical touch signal in the touch center region is larger than the second signal amount of an optical touch signal in the touch edge region, and the third signal amount of an optical touch signal in the characteristic region is larger than the fourth signal amount of an optical touch signal in the non-characteristic region.

16. The acquisition method according to claim 13, wherein the first touch signal is one of an electrical touch signal and an optical touch signal, and the second touch signal is the other one of the electrical touch signal and the optical touch signal.

17. The acquisition method according to claim 11, wherein after determining the characteristic region as the dermatoglyphics scan region and before scanning the dermatoglyphics in the dermatoglyphics scan region and generating the dermatoglyphics data, the acquisition method further comprises:
    scanning again the dermatoglyphics in contact with the touch center region by using a touch scan method different from that used for selecting the characteristic region; and
    confirming the selected characteristic region as the dermatoglyphics scan region again according to a signal amount distribution of the touch signal obtained.

18. The acquisition method according to claim 11, wherein the dermatoglyphics is palmar dermatoglyphics, the touch center region corresponds to a center portion of the palm, and the characteristic region corresponds to main-line patterns in the center portion of the palm.

* * * * *